United States Patent
Faisal

(10) Patent No.: US 6,314,419 B1
(45) Date of Patent: Nov. 6, 2001

(54) METHODS AND APPARATUS FOR GENERATING QUERY FEEDBACK BASED ON CO-OCCURRENCE PATTERNS

(75) Inventor: Mohammad Faisal, San Mateo, CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/327,370

(22) Filed: Jun. 4, 1999

(51) Int. Cl.$^7$ .................................................... G06F 17/30
(52) U.S. Cl. .......................... 707/2; 707/3; 707/5; 707/6
(58) Field of Search ................... 707/3, 5, 6, 102, 707/2; 709/219

(56) References Cited

U.S. PATENT DOCUMENTS

| | | | |
|---|---|---|---|
| 5,542,090 | * | 7/1996 | Henderson et al. ............... 707/102 |
| 5,794,237 | * | 8/1998 | Gore, Jr. .............................. 707/5 |
| 5,974,412 | * | 10/1999 | Hazlehurst et al. ................... 707/3 |
| 6,029,195 | * | 2/2000 | Herz ................................. 709/219 |
| 6,078,917 | * | 6/2000 | Paulsen, Jr. et al. .................. 707/6 |
| 6,175,829 | * | 1/2001 | Li et al. ................................. 707/3 |

OTHER PUBLICATIONS

Claroff et al., "ImageRover: A Content–Based Image Browser for the World Wide Web", IEEE 1997, pp. 2–9.*

* cited by examiner

*Primary Examiner*—Wayne Amsbury
*Assistant Examiner*—Thuy Pardo
(74) *Attorney, Agent, or Firm*—Stattler Johansen & Adeli, LLP

(57) ABSTRACT

An information retrieval system generates query feedback terminology for an input query based on a corpus of documents and the input query. Potential query feedback terms are identified through the corpus of documents for use as query feedback in the information retrieval system. To process a query, which includes at least one query term, co-occurrence signatures for "N" query feedback terms are generated. An N×N matrix of the co-occurrence signatures depict patterns of semantic distance and conceptual proximity among the "N" query feedback terms. The N×N matrix is processed to reduce the number of the entries in the signature to an N×M matrix while preserving the co-occurrence distance characteristics among the signatures. Query feedback terms with co-occurrence signatures, which compare with co-occurrence signatures of the query term in a predetermined manner, are selected as query feedback.

17 Claims, 6 Drawing Sheets

FIG. 5A

| | QFT$_1$ | QFT$_2$ | QFT$_3$ | QFT$_4$ | QFT$_5$ | | QFT$_N$ |
|---|---|---|---|---|---|---|---|
| QFT$_1$ | 0 | 2 | 4 | 3 | 20 | | 17 |
| QFT$_2$ | 2 | 0 | 6 | 1 | 16 | | 13 |
| QFT$_3$ | 4 | 6 | 0 | 18 | 5 | | 6 |
| QFT$_4$ | 3 | 1 | 18 | 0 | 2 | | 30 |
| QFT$_5$ | 20 | 16 | 5 | 2 | 0 | | 4 |
| | | | | | | | |
| QFT$_N$ | 17 | 13 | 6 | 30 | 4 | | 0 |

FIG. 5B

| | | |
|---|---|---|
| QFT$_1$ | .4550 | -.2460 |
| QFT$_2$ | .4690 | -.6700 |
| QFT$_3$ | -.1000 | .2346 |
| QFT$_4$ | -.1234 | .9990 |
| QFT$_5$ | .4760 | .4998 |
| QFT$_N$ | .5740 | .2116 |

METHODS AND APPARATUS FOR GENERATING QUERY FEEDBACK BASED ON CO-OCCURRENCE PATTERNS

BACKGROUND OF THE INVENTION

1. Field of the Invention

The present invention is directed toward the field of information retrieval systems, and more particularly towards generating feedback to a user of an information retrieval system to facilitate the user in re-formulating the query.

2. Art Background

An information retrieval system attempts to match a user query (i.e., the user's statement of information needs) to locate information available to the system. In general, the effectiveness of information retrieval systems may be evaluated in terms of many different criteria including execution efficiency, storage efficiency, retrieval effectiveness, etc. Retrieval effectiveness is typically based on document relevance judgments. These relevance judgments are problematic since they are subjective and unreliable. For example, different judgement criteria assigns different relevance values to information retrieved in response to a given query.

There are many ways to measure retrieval effectiveness in information retrieval systems. The most common measures used are "recall" and "precision." Recall is defined as the ratio of relevant documents retrieved for a given query over the number of relevant documents for that query available in the repository of information. Precision is defined as the ratio of the number of relevant documents retrieved over the total number of documents retrieved. Both recall and precision are measured with values ranging between zero and one. An ideal information retrieval system has both recall and precision values equal to one.

One method of evaluating the effectiveness of information retrieval systems involves the use of recall-precision graphs. A recall-precision graph shows that recall and precision are inversely related. Thus, when precision goes up recall typically goes down and vice-versa. Although the goal of information retrieval systems is to maximize precision and recall, most existing information retrieval systems offer a trade-off between these two goals. For certain users, high recall is critical. These users seldom have means to retrieve more relevant information easily. Typically, as a first choice, a user seeking high recall may expand their search by broadening a narrow boolean query or by looking further down a ranked list of retrieved documents. However, this technique typically results in wasted effort because a broad boolean search retrieves too many unrelated documents, and the tail of a ranked list of documents contains documents least likely to be relevant to the query.

Another method to increase recall is for users to modify the original query. However, this process results in a random operation because a user typically has made his/her best effort at the statement of the problem in the original query, and thus is uncertain as to what modifications may be useful to obtain a better result.

For a user seeking high precision and recall, the query process is typically a random iterative process. A user starts the process by issuing the initial query. If the number of documents associated with the information retrieval system is large (e.g., a few thousand), then the hit-list due to the initial query does not represent the exact information the user intended to obtain. Thus, it is not just the non-ideal behavior of information retrieval systems responsible for the poor initial hit-lists, but the user also contributes to degradation of the system by introducing error. User error manifests itself in several ways. One way user error manifests itself is when the user does not know exactly what he/she is looking for, or the user has some idea what he/she is looking for but doesn't have all the information to specify a precise query. An example of this type of error is one who is looking for information on a particular brand of computer but does not remember the brand name. For this example, the user may start by querying for "computers."

A second way user error manifests itself is when the user is looking for some information generally interesting to the user but can only relate this interest via a high level concept. A world wide web surfer is an example of such a user. For example, the user may wish to conduct research on recent issues related to "Middle East", but does not know the recent issues to search. For this example, if a user simply does a search on "Middle East", then some documents relevant to the user, which deal with current issues in the "petroleum industry", will not be retrieved. The query feedback of the present invention guides users to formulate the correct query in the least number of query iterations as possible.

Another problem in obtaining high recall and precision is that users often input queries that contain terms that do not match the terms used to index the majority of the relevant documents and almost always some of the unretrieved relevant documents (i.e., the unretrieved relevant documents are indexed by a different set of terms than those used in the input query). This problem has long been recognized as a major difficulty in information retrieval systems. See Lancaster, F. W. 1969. "MEDLARS: Reports on the Evaluation of its Operating Efficiency." American documentation, 20(1), 8–36. As is explained fully below, the query feedback of the present invention solves the problem of matching user input queries to identify the relevant documents by providing feedback of relevant terms that may be used to reformulate the input query.

SUMMARY OF THE INVENTION

An information retrieval system generates query feedback terminology based on an input query and a corpus of documents. Specifically, a set of query feedback terms are identified through a plurality of documents for potential use as query feedback in the information retrieval system. To process a query, which includes at least one query term, co-occurrence signatures for the query feedback terms of a set are generated. The co-occurrence signatures comprise a plurality of entries, such that each entry depicts a co-occurrence distance between two query feedback terms of the set as they appear in the corpus of documents. Thus, the co-occurrence signatures depict patterns of semantic distance and conceptual proximity among the different query feedback terms. The signatures are processed, via an updated singular value decomposition technique, to reduce the number of the entries in the signature while preserving the semantic distance and conceptual proximity characteristic among the signatures. Query feedback terms with co-occurrence signatures are selected that compare with co-occurrence signatures of the query term in a predetermined manner, and thereafter displayed as query feedback terms as at least a partial response to the user query.

BRIEF DESCRIPTION OF THE DRAWINGS

FIG. 5a illustrates an example N×N signature matrix.

FIG. 5b illustrates the example matrix of FIG. 5a reduced through USVD processing.

DETAILED DESCRIPTION

Information Search & Retrieval System

Figure 1:
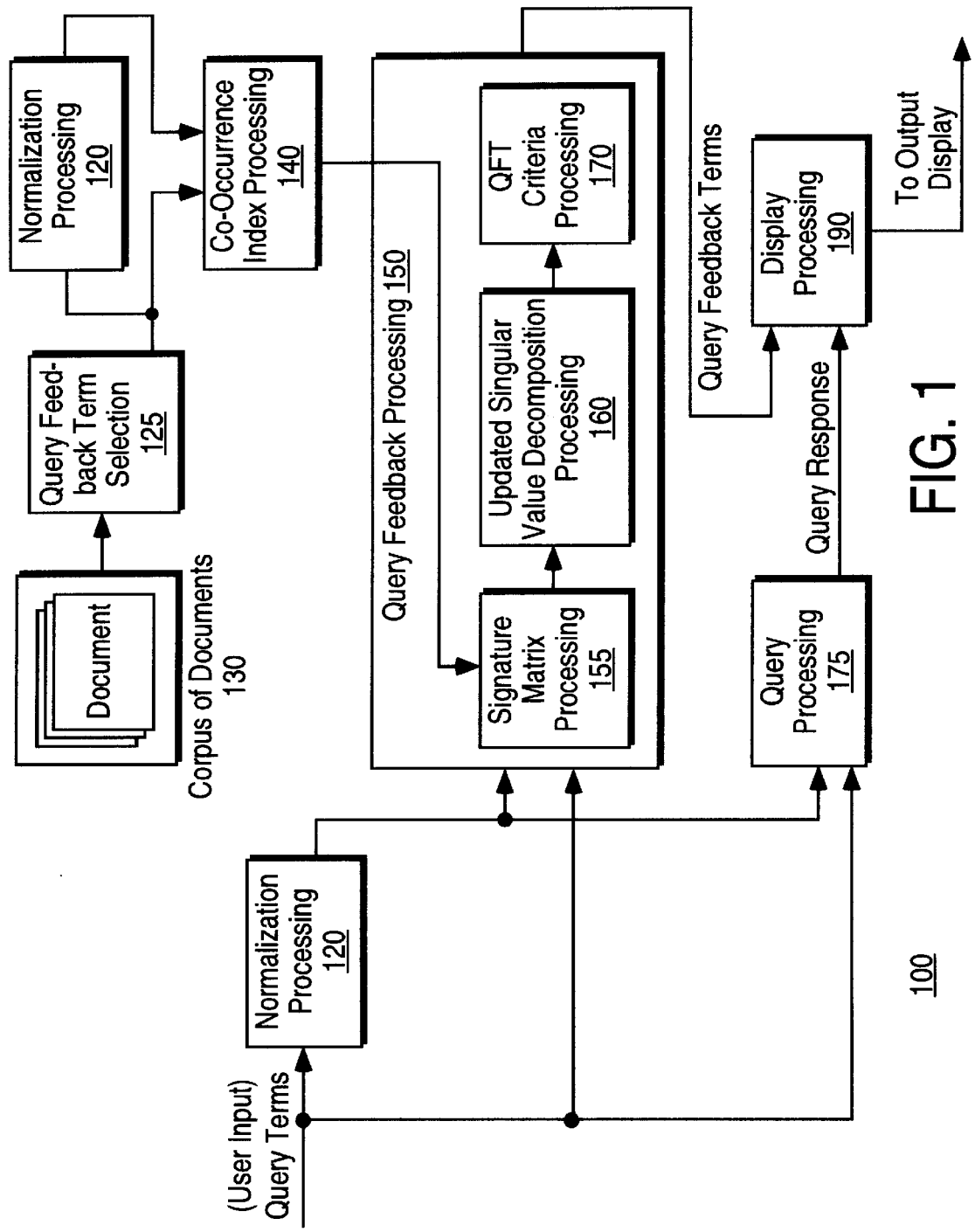
FIG. 1 is a block diagram illustrating an information search and retrieval system that incorporates the query feedback processing of the present invention.

FIG. 1 is a block diagram illustrating an information search and retrieval system that incorporates the query feedback processing of the present invention. As shown in FIG. 1, an information search and retrieval system 100 receives, as input, user input query in the form of one or more query terms, and generates, as output, a query response that includes query feedback terminology. In general, the query feedback terminology comprises one or more terms conceptually or linguistically related to the terms of the user input query. In turn, the user may use the query feedback terms to reformulate the input query.

The information search and retrieval system 100 operates in association with a corpus of documents 130. The corpus of documents 130 includes one or more documents that cover any type of subject matter. The content of the documents 130 may include articles, books, periodicals, etc., on one or more subjects. For example, the corpus of documents 130 may comprise, for a medical library, journals and books on cardiology. The corpus of documents 130 may include a compilation of information compiled or accessed from any source. For example, the documents 130 may be information stored on a computer system (FIG. 6) as computer readable text. Also, the corpus of documents 130 may be stored at one or more remote locations and accessed via a network by the information search and retrieval system 100.

In one embodiment, to process the query, the query terms are input to normalization processing 120. In general, normalization processing 120 processes the one or more query terms to generate linguistic variants for the individual query terms. For example, if the user query includes the query term "medical", then normalization processing 120 may generate the linguistic variant "medicine." Normalizing the query terms in normalization processing 120 enhances accuracy and performance of the information search and retrieval system 100. As indicated by the lines and arrows in FIG. 1, the query terms may be input directly to query processing 175 and query feedback processing 150. Otherwise, the linguistic variants of the query terms are input to the query feedback processing 150 and query processing 175.

The query feedback technique of the present invention generates query feedback terms from a corpus of documents associated with the information search and retrieval system. In general, the information search and retrieval system 100 pre-processes the corpus of documents 130 to identify query feedback terminology (i.e., words and phrases) to use as query feedback. To this end, query feedback term selection 125 accesses the corpus of documents 130 and selects terminology from the documents for use as query feedback. In one embodiment, the query feedback term selection 125 identifies nouns, noun phrases (i.e., multiple nouns in a row), and an adjective followed by one or more nouns.

The output of query feedback term selection 125, a list of terminology, is input to co-occurrence index processing 140.

In an alternative embodiment, the list of terminology is input to normalization processing 120 to generate linguistic variants of the terminology. For this embodiment, the list of terminology and its linguistic variants are then input to co-occurrence index processing 140. In general, co-occurrence index processing 140 generates an index, for each term of the list of terminology, that identifies terminology from the documents that co-occur with that term in the corpus of documents within a predetermined length. For example, if the term "cardiovascular" and "heart disease" co-occur twenty times in the corpus of documents within a distance of 40 words, then the index for "cardiovascular" stores "heart disease" with a score of 20. One embodiment for co-occurrence index processing 140 is described in a flow diagram of FIG. 3.

Query feedback processing 150 receives the set of query feedback terms, in the form of an index, the query terms (normalized or not), and generates query feedback terms as at least a partial response to the user query. For the embodiment of FIG. 1, query feedback processing 150 includes signature matrix processing 155, updated singular value decomposition (USVD) processing 160, and query feedback terminology (QFT) criteria processing 170.

In general, the signature matrix processing 155 generates a signature for each query feedback term in the set of query feedback terms identified by query feedback term selection 125. The signature matrix processing 155 receives the set of query feedback terms to identify those query feedback terms with a conceptual proximity to the user input query terms. A co-occurrence signature for a term, which includes a plurality of entries, depicts co-occurrence distances among a query feedback term and the other query feedback terms in the set. Thus, each query feedback term in the set includes a co-occurrence signature. The co-occurrence signatures depict patterns of semantic distance among the different query feedback terms. For example, if two query feedback terms have a similar co-occurrence signature, thereby indicating a similar co-occurrence distance with other terms in the corpus of documents, then those two terms have a semantic association (i.e., the two terms have a usage association). The closer the co-occurrence signature is between two terms, then the closer the two terms are in conceptual proximity (i.e., the two terms connote a similar concept).

In one embodiment, the signature matrix processing 155 generates a N×N matrix, corresponding to N query feedback terms, wherein each entry of the matrix indicates the co-occurrence of the two respective terms in the corpus of documents 130 within a specified distance. The co-occurrence signatures are compiled in an N×N matrix to ascertain conceptual proximity among the input query terms and the set of query feedback terms. Although the N×N matrix provides a compilation of co-occurrence signatures for all query feedback terms in the set, storage of such a large matrix in computer memory is impractical. For example, the corpus of documents 130 may include hundreds of thousands of documents, and each document may contain thousands of terms suitable as query feedback terminology. An N×N matrix for a set of query feedback terms that includes a cyclical number of query feedback terms (i.e., N) in the order of several hundred thousand making the product N×N too large a number of entries to store in computer memory.

In order to compile a matrix that includes co-occurrence signatures among query feedback terms in the set, query feedback processing 150 employs an updated singular value decomposition (USVD) algorithm. For this embodiment, the N×N matrix of co-occurrence signatures is input to the USVD processing 160, whereby the matrix is reduced in size to an N×M matrix. In general, the USVD algorithm processes the N×N matrix to reduce the matrix to a N×M matrix, while maintaining the distance characteristics of the co-occurrence signatures among the query feedback terms in the set. The USVD algorithm does not require storage of the entire N×N matrix, but requires as input only portions of the N×N matrix when processing the matrix for reduction to an N×M matrix. Thus, the use of USVD algorithm provides a practical computer implementation that permits comparison of co-occurrence signatures among a large number of query feedback terms of a set.

Let the N×N matrix of co-occurrence signatures be called C. Singular Value Decomposition (SVD) of any matrix C involves identifying the matrix $U_c$ (size N×$R_A$), matrix $W_c$ (size $R_A$×$R_A$), and matrix $V_c$ (size N×$R_A$), such that $$C = U_c W_c V_c^T$$

Matrices $U_c$ and $V_c$ are each orthogonal in the sense that their columns are orthonormal.

$W_c$ is a diagonal matrix with positive or zero elements.

$R_A$ is the rank of C.

The goal is to identify the reduced dimension matrix $V_M$ of size N×M which is the first M column of $V_c$. USVD estimates $V_M$ by initializing matrix $\hat{V}_M$ and then refining it by using columns of C as input. Once all the columns of C are digested by USVD, $\hat{V}_M$ becomes a very close approximation to $V_M$. So now our goal is to initialize $\hat{V}_M$ and then iteratively refine it.

In order to initialize:

Obtain first L columns of C from 144 and define this as matrix A (size N×L). Choose L as large as allowed by memory.

Perform SVD of A such that $A = \hat{U} \hat{W} \hat{V}^T$

Define $\hat{U}_M$ (size N×M) as the first M columns of $\hat{U}$,

Define $\hat{W}_M$ (size M×M) as the first M columns and rows of $\hat{W}$,

Define $\hat{V}_M$ (size L×M) as the first M columns of $\hat{V}$.

The iterative refinement of $\hat{V}_M$ is performed by:

Obtain next d columns from 144 and define this as N×d matrix D.

Choose d as large as allowed by memory.

Compute M×(M+d) matrix F as $$F = [\hat{W}_M \,|\, \hat{U}_M^T D]$$

Perform SVD of F such that $F = U_F W_F V_F^T$

Refine $\hat{U}_M$ (size $N \times M$) using $\hat{U}_M^{new} = \hat{U}_M U_F$

Refine $\hat{W}_M$ (size $M \times M$) using $\hat{W}_M^{new} = W_F$

Refine $\hat{V}_M$ (size (L+d)×M) using $$\hat{V}_M^{new} = \left[\begin{array}{c|c} \hat{V}_M & 0 \\ \hline 0 & I_d \end{array}\right] V_F$$

where $I_d$ is identity matrix of size d×d.

If more columns available from 144 then:
set L=L+d;

set $\hat{U}_M = \hat{U}_M^{new}$ (size $N \times M$);

set $\hat{W}_M = \hat{W}_M^{new}$ (size $M \times M$);

set $\hat{V}_M = \hat{V}_M^{new}$ (size $L+d) \times M$).

Go to the beginning of the iterative refinement of $\hat{V}_M$, or otherwise reduce dimension matrix $\hat{V}_M = \hat{V}_M^{new}$ of size N×M.

Figure 2:
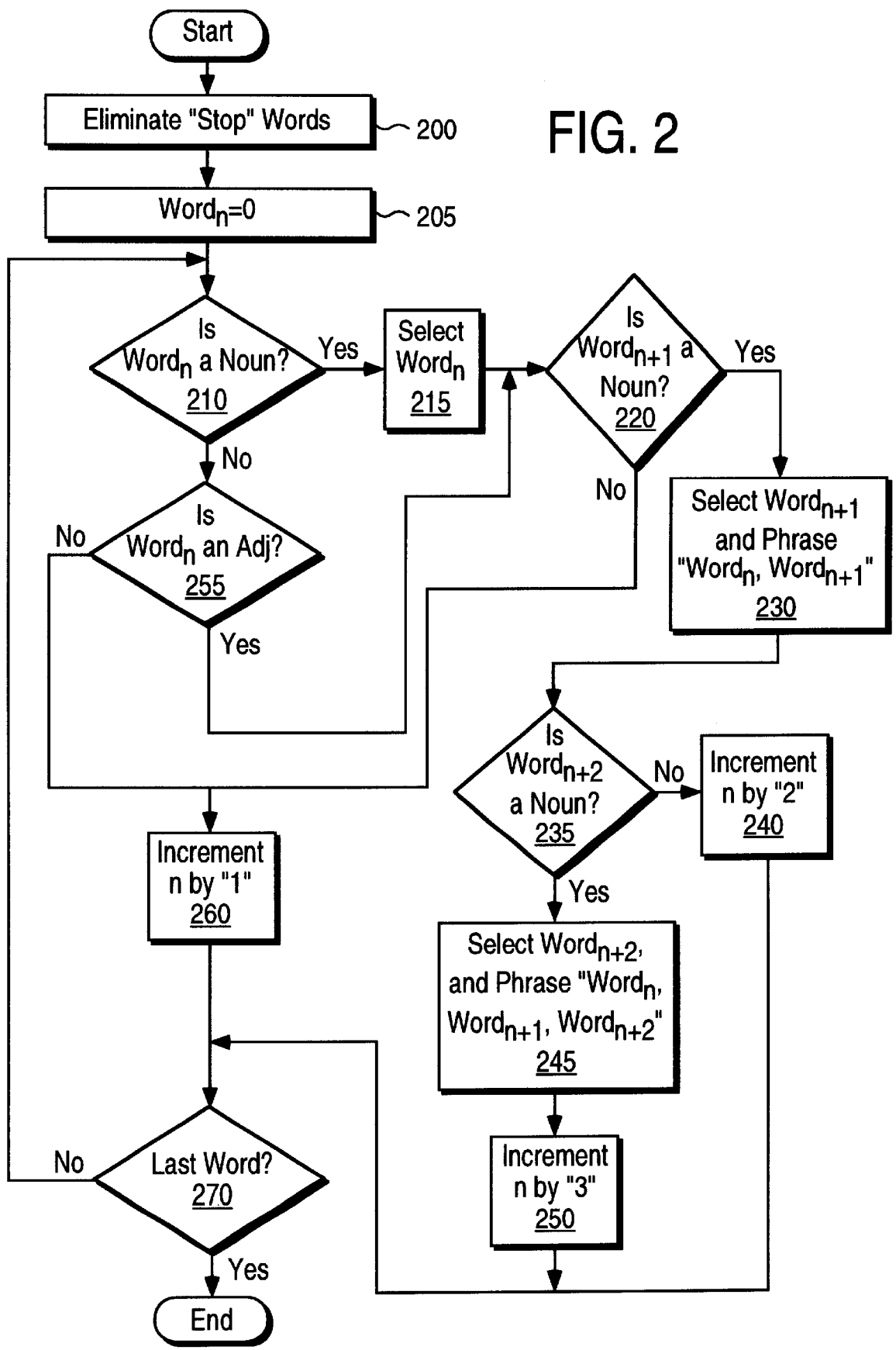
FIG. 2 is a flow diagram illustrating one embodiment for query feedback term selection.

FIG. 2 is a flow diagram illustrating one embodiment for query feedback term selection. The query feedback term selection 125 (FIG. 1) processes documents in the corpus of documents 130 to generate the query feedback term set. As shown in step 200, the "stop" words in the documents are eliminated from consideration as query feedback terms. The stop words are those words that convey little or no content. Stop words include articles (i.e., "a" and "the"), prepositions, etc. For the embodiment shown in FIG. 2, a process is executed to identify phrases consisting of nouns and phrases consisting of an adjective followed by one or more nouns. For this embodiment, a word count, designated $word_n$, is initialized to 0 as shown in block 205. If the current word, designated as $word_n$, is a noun, then the word is selected as a query feedback term as shown in blocks 210 and 215. If the next word, $word_{n+1}$, is also a noun, then the phrase "$word_n$, $word_{n+1}$" is selected as query feedback terminology as shown in blocks 220 and 230. If the third word in this sequence, $word_{n+2}$, is also a noun, then the phrase "$word_n$, $word_{n+1}$, $word_{n+2}$" is selected as query feedback terminology as shown in blocks 235 and 245. The word count, n, is incremented appropriately as shown in blocks 240, 250 and 260.

If the current word under analysis is not a noun, but is an adjective, then the next word, $word_{n+1}$, is evaluated to determine if it is a noun as shown in blocks 255 and 220. If it is, then the phrase "$word_n$ (adjective) $word_{n+1}$ (noun)" is selected as query feedback terminology. Similarly, if an additional noun is located in word position $word_{n+2}$, then the phrase "$word_n$ (adjective), $word_{n+1}$ (noun), $word_{n+2}$ (noun)" is selected as query feedback terminology. As shown in FIG. 2, this process is repeated for all words in a document as shown by decision block 270. Similarly, the process is repeated for all documents in the corpus of documents 130.

Figure 3:
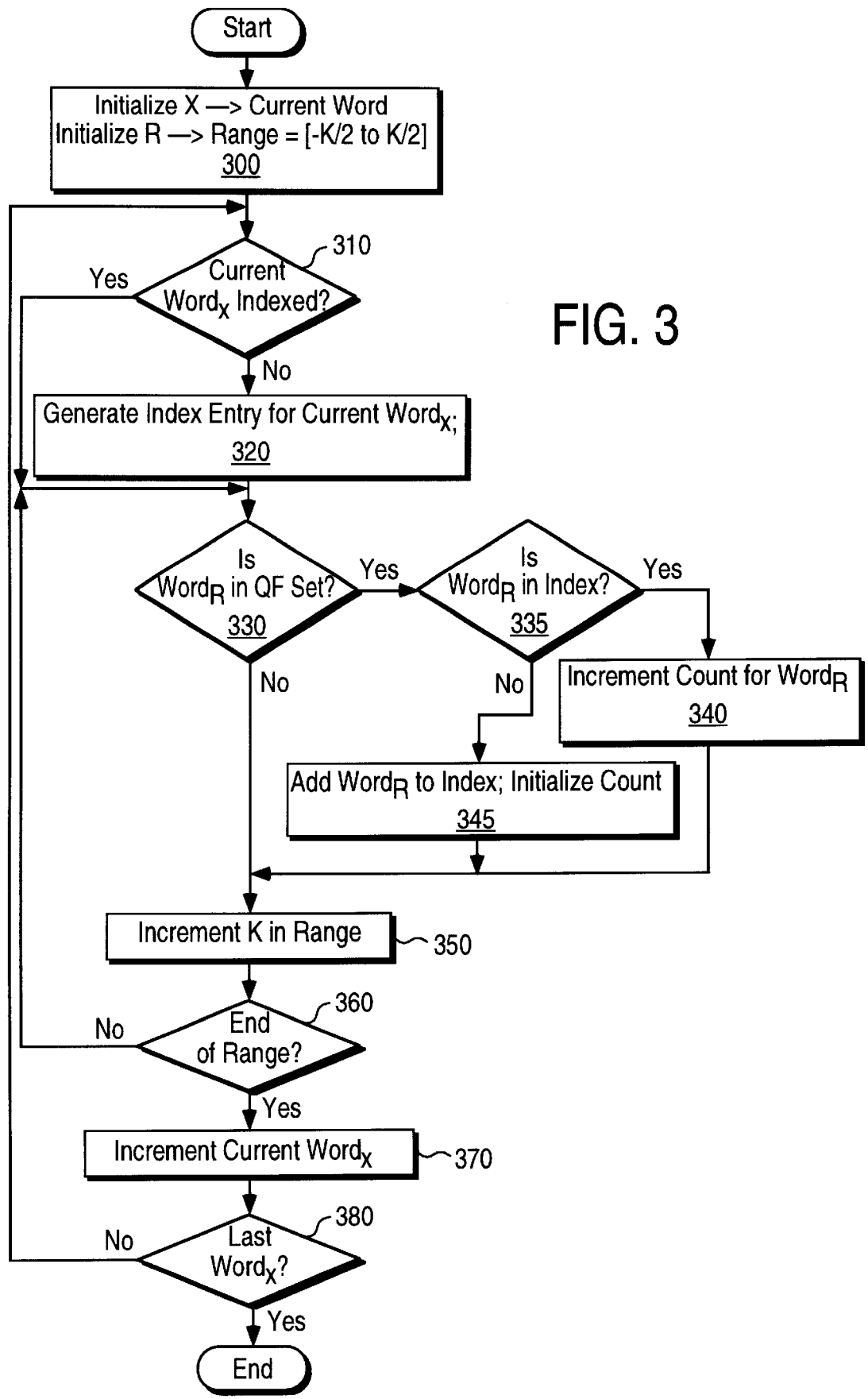
FIG. 3 is a flow diagram illustrating one embodiment for co-occurrence index processing.

FIG. 3 is a flow diagram illustrating one embodiment for co-occurrence index processing 140 (FIG. 1). As shown in block 300, a range to measure the co-occurrence of words is defined. The range, defined as R, is set to (−K\2 to K\2), wherein K defines the number of words in the entire range. In one embodiment, K is set to 40. However, K may be set to any integer value for which identification of co-occurrence of words is desired. The range is always bounded by document boundaries (i.e., the range cannot span across document boundaries). As shown in block 300, the current word under analysis is designated as $word_X$. If the current word, $word_X$, is not indexed, then an index entry is generated for $word_X$, as shown in blocks 310 and 320. If an index entry exists for the current word, or one has been created, then a search is conducted to identify if any words contained in the query feedback set are within the range of the current word. This process is illustrated in steps 330, 335, 340, 345, 350 and 360. Specifically, for each word in the range of word$_X$, denoted word$_R$, identification of word$_R$ in the query feedback set is determined (block 330). If word$_R$ is in the co-occurrence index for word$_X$, then the count for that word (word$_R$) is incremented (blocks 335 and 340). If word$_R$ is not part of the index for word$_X$, then word$_R$ is added to the index of word$_X$, and its count is initialized (blocks 335 and 345). In one embodiment, the range, R, is limited to a single paragraph. If the current word, word$_X$, is located five words from the end of the paragraph, then only four words are searched in the forward direction (i.e., K\2). The process for the current word, word$_X$, is repeated for each word (blocks 370 and 380). Similarly, all documents are processed in accordance with co-occurrence index processing of FIG. 3.

Figure 4:
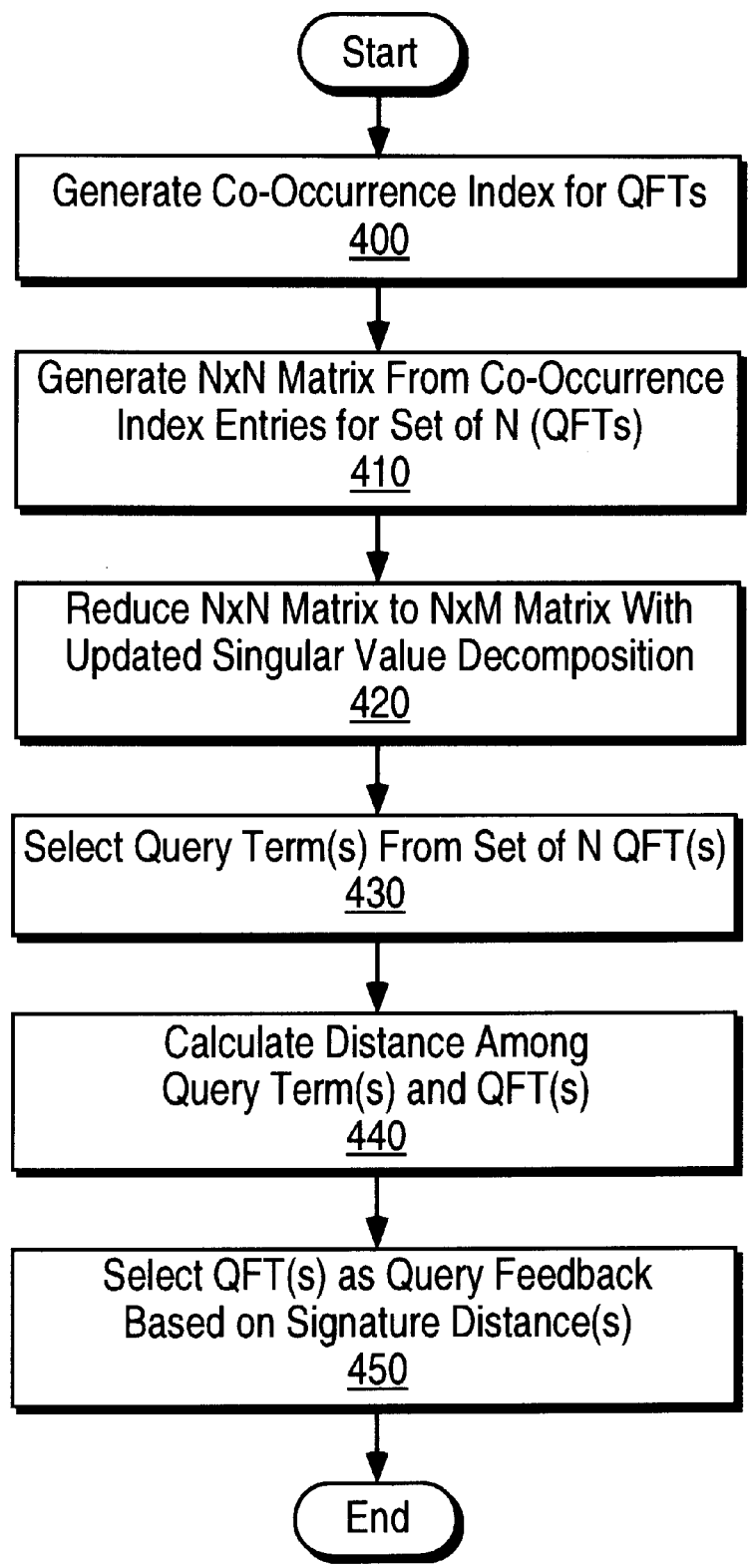
FIG. 4 is a flow diagram illustrating one embodiment for query feedback processing.

FIG. 4 is a flow diagram illustrating one embodiment for query feedback processing. As a pre-processing step, co-occurrence index is generated for terms in the query feedback term set (block 400). In one embodiment, to generate the co-occurrence signatures, a matrix consisting of N×N is generated piecemeal (block 410). FIG. 5a illustrates an example of a partial N×N signature matrix. As shown in FIG. 5a, the matrix includes a plurality of columns, labeled query feedback term QFT$_1$–QFT$_N$. Similarly, the matrix of FIG. 5a includes a plurality of rows, labeled QFT$_1$–QFT$_N$. As shown in FIG. 5a, the entry corresponding to two different query feedback terms indicates the co-occurrence of those terms within the specified range in the corpus of documents. For example, the entry for column QFT$_1$ and row QFT$_3$ is "4." This indicates that, for the corpus of documents 130, QFT$_1$ co-occurred with QFT$_3$ four times within the specified range "R." A "0" is inserted in the entries for the same term (e.g., column QFT$_1$ and row QFT$_1$). Also note that only one half of the matrix (i.e., the bottom or the top half formed by the diagonal of "X" entries) is required to define the co-occurrence signatures.

In one embodiment, signal matrix processing 155 (FIG. 1) utilizes the co-occurrence index entries to generate the N×N matrix. Specifically, to populate the signature matrix, signature matrix processing 155 extracts the count for the row\column QFT for the co-occurrence index of column\row. For example, to populate the entry in column 2, row 1, signature matrix processing 155 extracts the count, 2, from the entry QFT$_2$ in the co-occurrence index for QFT$_1$. For purposes of explanation, the co-occurrence signatures are viewed from each row (i.e., row 1 represents co-occurrence signature for QFT$_1$, row 2 represents co-occurrence signature for QFT$_2$, etc.). However, co-occurrence signatures may also be measured with respect to columns (e.g., column "1" is the co-occurrence signature matrix for QFT$_1$).

As shown in block 420 of FIG. 4, the N×N matrix is reduced to a N×M matrix without losing the distance characteristics in the co-occurrence signature. The reduction of signature matrix N×N to N×M is dependent upon whether the column or row is used to identify the co-occurrence signature. The reduction from N columns to M columns assumes a measurement of co-occurrence signature with respect to rows (e.g., row 1 defines the signature for QFT$_1$).

In one embodiment, the signature matrix is reduced through executing an updated singular value decomposition (USVD) algorithm (block 160, FIG. 1). FIG. 5b illustrates a N×M signature matrix reduced through USVD processing.

As shown in FIG. 5b, the columns are reduced to two columns for each co-occurrence signature. Although the N×M matrix includes only two columns, the distance measurement, relative to other rows, has been retained.

The QFT criteria processing 170 (FIG. 1) selects query terms from the set of "N" QFT(s) (block 430, FIG. 4). In general, QFT criteria processing 170 selects those query feedback terms that have co-occurrence signatures similar to those co-occurrence signatures of terms in the input query. For example, if the user input query terms included QFT$_2$ and QFT$_5$, then QFT criteria processing 170 selects QFT$_2$ and QFT$_5$ as a base line to compare other co-occurrence signatures. In one embodiment, QFT criteria processing 170 calculates the co-occurrence signature distance between the query terms and the QFTs.

Another popular similarity measure is called the cosine similarity measure. For the N×N matrix, the cosine similarity measure between co-occurrence signature of QFT$_x$ and QFT$_y$ is given by:

$$\frac{\sum_{m=1}^{N}[QFT_x(value_m) \times QFT_y(value_m)]}{\sqrt{\sum_{m=1}^{N}[QFT_x(value_m)]^2 \times \sum_{m=1}^{N}[QFT_y(value_m)]^2}}$$

For the N×M matrix obtained via USVD, the cosine similarity measure between co-occurrence signature of QFT$_x$ and QFT$_y$ is given by:

$$\frac{\sum_{m=1}^{M}[QFT_x(value_m) \times QFT_y(value_m)]}{\sqrt{\sum_{m=1}^{M}[QFT_x(value_m)]^2 \times \sum_{m=1}^{M}[QFT_y(value_m)]^2}}$$

This calculation is based on the distances provided in the N×M signature matrix (i.e., the output of the USVD processing 160). The value of this similarity measure ranges between 1 and −1. The closer the value is to 1, the more similar are QFT$_x$ and QFT$_y$. In one embodiment, the distance between co-occurrence signatures QFT$_x$ and QFT$_y$ is given by:

$$\sqrt{[QFT_x(value_1) - QFT_y(value_1)]^2 + ... + [QFT_x(value_N) - QFT_y(value_N)]^2}$$

where QFT$_x$ (value$_m$) is the m$^{th}$ value in the signature of QFT$_x$ in the N×N matrix and QFT$_y$ (value$_m$) is the m$^{th}$ value in the signature of QFT$_y$ in the N×N matrix.

After USVD processing, the distances are equated from the N×M matrix as:

$$\sqrt{[QFT_x(value_1) - QFT_y(value_1)]^2 + ...[QFT_x(value_m) - QFT_y(value_m)]^2}$$

where, QFT$_x$ (Value$_m$) is the m$^{th}$ value for QFT$_x$ in the reduced matrix N×M and QFT$_y$ (Value$_m$) is the m$^{th}$ value for QFT$_y$ in the reduced matrix N×M.

For the example of FIG. 5b, an N×M matrix, the distances among the co-occurrence signature of QFT$_2$ and co-occurrence signatures of [QFT$_1$, QFT$_3$, QFT$_4$, QFT$_5$ and QFT$_N$] are set forth in Table 1 below.

TABLE 1

| QFT$_2$/QFT$_1$ | QFT$_2$/QFT$_3$ | QFT$_2$/QFT$_4$ | QFT$_2$/QFT$_5$ | QFT$_2$/QFT$_N$ |
|---|---|---|---|---|
| .1654 | 1.0687 | 1.7710 | 1.1698 | .8878 |

For the query term corresponding to QFT$_5$, the co-occurrence distances among QFT$_5$ and (QFT$_1$, QFT$_2$, QFT$_3$, QFT$_4$, and QFT$_N$) are set forth in Table 2.

TABLE 2

| QFT$_5$/QFT$_1$ | QFT$_5$/QFT$_2$ | QFT$_5$/QFT$_3$ | QFT$_5$/QFT$_4$ | QFT$_5$/QFT$_N$ |
|---|---|---|---|---|
| .7461 | 1.1698 | .6341 | .7801 | .3044 |

The QFT criteria processing 170 may use any criteria to select query feedback terms based on the co-occurrence signatures. In one embodiment, QFT criteria processing 170 selects a fixed number of query feedback terms. Specifically, for this embodiment, query feedback terms are selected based on those terms that have co-occurrence signatures that compare closest with the co-occurrence signatures of the query terms (i.e., the distances between signatures is the smallest). For the example data of Tables 1 and 2, if the fixed number is set to 3, then query feedback terms QFT$_1$, QFT$_N$, and QFT$_3$ are selected for the input query term QFT$_2$, and query feedback terms QFT$_N$, QFT$_3$, and QFT$_1$ are selected for the input query term QFT$_5$.

In another embodiment, QFT criteria processing 170 selects query feedback terms based on a predetermined cut-off point. For this embodiment, the query terms selected have a semantic distance and conceptual proximity to the input query term at least as close as the predetermined cut-off threshold. For the example data in Tables 1 and 2, if the cut-off threshold is set to 1.0 then query feedback terms QFT$_1$ and QFT$_N$ are selected for the input query term QFT$_2$, and query feedback terms QFT$_N$, QFT$_4$, QFT$_3$ and QFT$_1$ are selected for the input query term QFT$_5$. As will be appreciated by one skilled in the art, any type of algorithm, such as a statistical algorithm, may be used to select query feedback terms based on comparisons among co-occurrence signatures.

Normalization Processing

Starting with the first query term, normalization processing 120 (FIG. 1) determines whether a canonical form exists for the term. In general, nominalization refers to a noun form for a non-noun based word. Different languages have different criteria for defining the canonical form of a noun. The canonical or base form of a term is typically ascertained by looking up the term in a lexicon. If the transformation from term to canonical or base form cannot be accomplished by looking up the term in a lexicon, morphological processing can be executed on the term in an attempt to create the base form from some set of transformations. This is a language specific process, and the quality of the base form so generated is directly related to the quality of the morphology. If the term is a noun, then it has a canonical form. In rare cases, morphology can be executed on the noun to find its canonical form.

Words with suffixes, such as "tion" and "ity", are the preferred canonical forms for query feedback processing. In some cases, morphology unrelated forms of a noun with a bad suffix are chosen as canonical forms as long as their meaning is preserved. Table 3 lists examples of the preferred canonical form of a noun and a list of alternate forms for the noun indented.

TABLE 3 beauty
    beautifulness
    beautiousness
    beauties
scamps
    scampishness
    scampishnesses
    scamp
stupidity
    dull-headedness
    dull-headednesses
    lame-brainedness
    lame-brainednesses
    stupidities
cooperation
    cooperating Exceptions to this rule are nouns that have become very common in their "ness", "ing" or "bility" forms, or are not readily separable from their suffixes such as "sickness", "fishing" and "notability."

Similar to non-noun based forms, canonical nouns do not have mood-changing prefixes. Table 4 lists three non-noun base forms, in their canonical forms, with non-mood-changing prefixes indented.

TABLE 4 spots
    unspottedness
    spottedness
professionalism
    unprofessionalism
taste
    distastefulness
    tastefulness Exceptions to this rule are, as with non-noun based forms, those nouns which, when the prefix is removed, do not retain their meaning or even their part of speech. Examples of these exceptions are "distension", "exploration", or "unction."

If the canonical form exists, then the canonical form is used instead of the term as the term for query processing. Normalization processing 120 ascertains whether the query term is a noun. In one embodiment, the lexicon indicates whether the term is a noun.

In English, proper nouns are defined as nouns that represent specific people, places, days and months, organizations, businesses, products, religious items, or works of art. Proper nouns initial letters are almost always capitalized. Exceptions to capitalization are rare, and are usually for artistic or attention getting reasons. A proper noun phrase is a noun phrase that begins and ends with a proper noun. Table 5 lists valid proper nouns or noun phrases.

TABLE 5

Chicago
Carlton Fisk
October
International Society of Engineers
e.e. cummings
Judgement Day Table 6 lists noun phrases that are not valid proper noun phrases.

TABLE 6

California condor
heart of Texas
AWOL (this is an acronym of a common noun phrase)

In very rare cases, proper nouns or noun phrases pluralize. If they do, the plural form is canonical. For example, "Texans" is the canonical form of "Texan." Also, "Geo Prisms" is the canonical form of "Geo Prism."

When a proper noun phrase is represented by an acronym, the canonical form is a phrase consisting of the acronym, without periods, followed by a hyphened followed by the full unabbreviated noun phrase. Each possible form of the acronym and the phrase it stands for becomes the alternate form of the new canonical form. Table 7 lists the canonical form first with the non-exhaustive examples of alternate forms indented.

TABLE 7

MISL - Major Indoor Soccer League
    MISL
    M.I.S.L.
    Major Indoor Soccer League Commercial names also appear as query terms and terms in documents. There are many alternate forms for most commercial proper noun phrases. Those phrases, although do not have acronyms associated with them, still require a consistent canonical form representation. For English proper noun phrases, Table 8 lists a set of rules for commercial names.

TABLE 8

All abbreviations will be spelled out
    Inc. --> Incorporated
    Int'l. --> International
    Org. --> Organization
Hyphens will be preferred where there is a choice
    Long Term --> Long-Term
    Alka Seltzer --> Alka-Seltzer
Ampersands will be used in place of the word 'and'
    Growth and Income --> Growth & Income The rules, set forth in Table 8, when combined in proper noun phrases with multiple features, create many alternate forms from a single canonical form. Since there is no way to predict how a company or product is going to be referred to in a query or document, this proliferation of alternate forms is necessary to achieve consistent representations whenever possible. Table 9 lists the canonical form of a corporation, and then continues with an indented list of alternate forms.

TABLE 9

Cahill, Gordon & Reindel
    Cahill, Gordon and Reindel
    Cahill, Gordon, & Reindel
    Cahill, Gordon, and Reindel
Commodore International, Incorporated
    Commodore, Inc.
    Commodore Inc.
    Commodore, Inc
    Commodore, Incorporated
    Commodore Incorporated
    Commodore International
    Commodore International, Inc.

TABLE 9-continued

Commodore International Inc.
    Commodore International, Inc
    Commodore International Inc
    Commodore International Incorporated
    Commodore Int'l., Inc.
    Commodore Int'l., Inc
    Commodore Int'l. Inc.
    Commodore Int'l. Inc
    Commodore Int'l. Incorporated The canonical forms of common noun phrases are created using the same rules as single common nouns and proper noun phrases. The mass singular form is preferred, the count plural form is next. Any abbreviations, acronyms, hyphens or ampersands are handled as they are in proper noun phrases. Table 10 lists canonical forms and common noun phrases, indented, that pertain to the canonical form.

TABLE 10 atomic bombs
    A-bomb
    A bomb
    A-bombs
    A bombs
    atom bomb
    atom bombs
    atomic bomb
satirical poetry
    satirical poetries Some noun phrases refer to the same entity, and are referred to as "multiple referents." Cases where different nouns or noun phrases refer to exactly the same entity, then one noun is usually selected as the canonical form, and the other nouns considered alternate forms. Table 11 lists noun and noun phrases that refer to the same entity, wherein the canonical form is left justified and the alternate forms are indented.

TABLE 11

Mark Twain
    Samuel Clemens
    Samuel L Clemens
    Samuel L. Clemens
    Samuel Longhorn Clemens
angelfish
    angelfishes
    scalare
    scalares If the term is not a noun, then a determination is made as to whether the query term has a nominal form. If the term has a nominal form, then the nominal form is used as a term, instead of the term. If the term does not have a nominal form, then the term is used as the term.

If the term is a noun, then a further inquiry determines whether the term is a mass noun. The preferred canonical form of a noun or noun phrase in English is its mass singular form. Nouns, which are mass only nouns, such as "chess" or "goats milk" have only one form, and this is the canonical form. However, most nouns that are mass nouns are also count nouns. The canonical form of count nouns is typically the mass singular form. Examples of these types of nouns are "description", "fish", and "cheese." The count plural forms of these nouns ("descriptions", "fishes", and "cheeses") are referred to as alternate forms, and are transformed to the mass singular form for use as terms.

If the input term is not a mass noun, then the normalization processing determines whether the term has a plural form. If a noun or a noun phrase does not have a mass sense, then its canonical form is the count plural form. Nouns such as "chemical", "personal computer", and "California Condor" are alternate forms of the canonicals "chemicals", "personal computers", and "California Condors", respectively. If the plural form does exist, then the plural form is used as the term for query processing. If the plural form does not exist, then the input term is used as the term. Whether mass or count, there are several noun candidates for canonical form which are very close in meaning, but which have various levels of desirability based on morphology. Typically, nouns ending in "ness", "ing", and "bility" do not make very good canonical forms and are usually listed as alternate forms of more basic nouns. Unsuffixed forms are preferred. The nominalization process is repeated for each query term.

The normalization processing 120 also includes processes to eliminate the case sensitivity problem, when appropriate. The lexicon contains information (e.g., definitional characteristics) for a plurality of words. One definitional characteristic defines the part of speech for the corresponding word. For example, the lexicon identifies whether a word is a common noun. Furthermore, the lexicon identifies the amount of content carrying information for a corresponding word. In general, the normalization processing 120 utilizes the definitional characteristics in the lexicon to determine whether to generate a lower case term from an upper case term when input as a term. In one embodiment, the normalization processing 120 generates lower case terms if the corresponding upper case term is both a common noun and a content carrying word. Names, which are proper nouns, are not converted. For terms converted, both the upper case term and the lower case term are used to process the query. Although certain upper case terms are converted to lower case terms, the original upper case query term is considered more relevant to the original query than the lower case term.

Computer System Implementation

Figure 6:
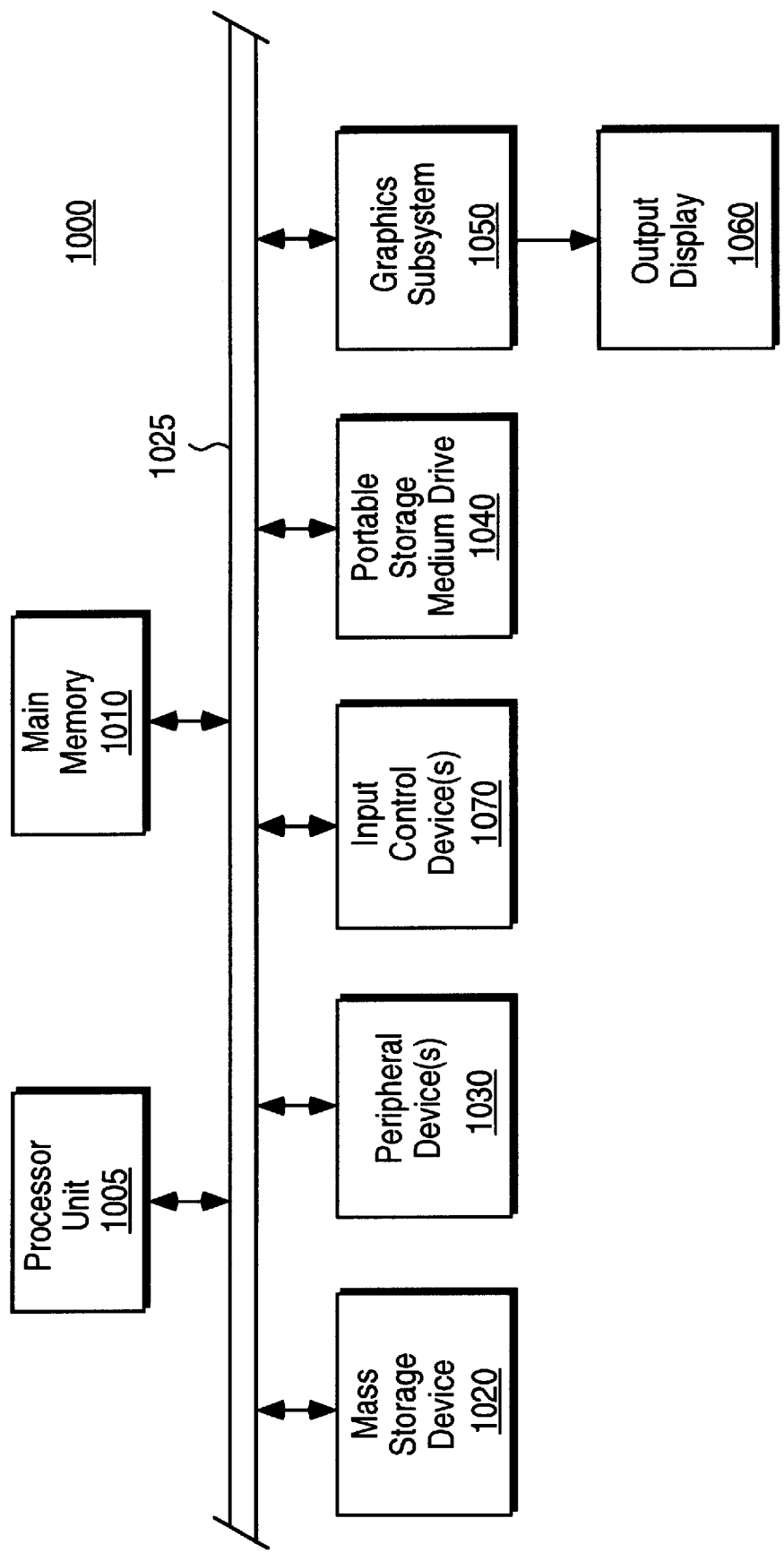
FIG. 6 illustrates a high level block diagram of a general purpose computer system in which the information search and retrieval system of the present invention may be implemented.

FIG. 6 illustrates a high level block diagram of a general purpose computer system in which the information search and retrieval system of the present invention may be implemented. A computer system 1000 contains a processor unit 1005, main memory 1010, and an interconnect bus 1025. The processor unit 1005 may contain a single microprocessor, or may contain a plurality of microprocessors for configuring the computer system 1000 as a multiprocessor system. The main memory 1010 stores, in part, instructions and data for execution by the processor unit 1005. If the information search and retrieval system of the present invention is wholly or partially implemented in software, the main memory 1010 stores the executable code when in operation. The main memory 1010 may include banks of dynamic random access memory (DRAM) as well as high speed cache memory.

The computer system 1000 further includes a mass storage device 1020, peripheral device(s) 1030, portable storage medium drive(s) 1040, input control device(s) 1070, a graphics subsystem 1050, and an output display 1060. For purposes of simplicity, all components in the computer system 1000 are shown in FIG. 6 as being connected via the bus 1025. However, the computer system 1000 may be connected through one or more data transport means. For example, the processor unit 1005 and the main memory 1010 may be connected via a local microprocessor bus, and the mass storage device 1020, peripheral device(s) 1030, portable storage medium drive(s) 1040, graphics subsystem 1050 may be connected via one or more input/output (I/O) busses. The mass storage device 1020, which may be implemented with a magnetic disk drive or an optical disk drive, is a non-volatile storage device for storing data and instructions for use by the processor unit 1005. In the software embodiment, the mass storage device 1020 stores the information search and retrieval system software for loading to the main memory 1010.

The portable storage medium drive 1040 operates in conjunction with a portable non-volatile storage medium, such as a floppy disk or a compact disc read only memory (CD-ROM), to input and output data and code to and from the computer system 1000. In one embodiment, the information search and retrieval system software is stored on such a portable medium, and is input to the computer system 1000 via the portable storage medium drive 1040. The peripheral device(s) 1030 may include any type of computer support device, such as an input/output (I/O) interface, to add additional functionality to the computer system 1000. For example, the peripheral device(s) 1030 may include a network interface card for interfacing the computer system 1000 to a network. For the software implementation, documents may be input to the computer system 1000 via a portable storage medium or a network for processing by the information search and retrieval system.

The input control device(s) 1070 provide a portion of the user interface for a user of the computer system 1000. The input control device(s) 1070 may include an alphanumeric keypad for inputting alphanumeric and other key information, a cursor control device, such as a mouse, a trackball, stylus, or cursor direction keys. The user query in input to the information search and retrieval system through an input control device. In order to display textual and graphical information, the computer system 1000 contains the graphics subsystem 1050 and the output display 1060. The output display 1060 may include a cathode ray tube (CRT) display or liquid crystal display (LCD). The graphics subsystem 1050 receives textual and graphical information, and processes the information for output to the output display 1060. The query response, including the query feedback of the present invention, are displayed on the output display. The components contained in the computer system 1000 are those typically found in general purpose computer systems, and in fact, these components are intended to represent a broad category of such computer components that are well known in the art.

The query feedback techniques may be implemented in either hardware or software. For the software implementation, the query feedback processing is software that includes a plurality of computer executable instructions for implementation on a general purpose computer system. Prior to loading into a general purpose computer system, the query feedback processing software may reside as encoded information on a computer readable medium, such as a magnetic floppy disk, magnetic tape, and compact disc read only memory (CD-ROM). In one hardware implementation, the query feedback processing may comprise a dedicated processor including processor instructions for performing the functions described herein. Circuits may also be developed to perform the functions described herein.

Although the present invention has been described in terms of specific exemplary embodiments, it will be appreciated that various modifications and alterations might be made by those skilled in the art without departing from the spirit and scope of the invention.

What is claimed is:

1. A method for generating query feedback terminology in an information retrieval system, said method comprising the steps of:

storing a plurality of query feedback terms identified through a plurality of documents for use as query feedback in said information retrieval system;

generating a plurality of co-occurrence signatures for each query feedback term in a set of said query feedback terms, wherein a co-occurrence signature comprises a plurality of entries, such that each entry depicts a co-occurrence distance between two query feedback terms as they appear in said documents, wherein said signatures depict patterns of semantic distance among said different query feedback terms;

processing said signatures to reduce a number of said entries in said signature while preserving said co-occurrence distance characteristic among said signatures;

selecting, as query feedback, query feedback terms with co-occurrence signatures that compare with co-occurrence signatures of said query term in a predetermined manner; and displaying said query feedback terms as at least a partial response to said query.

2. The method as set forth in claim 1, wherein:

the step of generating a plurality of signatures for each query feedback term comprises the step of generating an N×N sized matrix of said co-occurrence signatures, wherein N represents a number of query feedback terms in said set of query feedback terms; and the step of processing said signatures to reduce a number of said entries in said co-occurrence signatures comprises the step of reducing said size of said N×N matrix to a N×M matrix, wherein M comprises an integer value less than N.

3. The method as set forth in claim 2, wherein the step of reducing said size of said N×N matrix to a N×M matrix comprises the step of executing an updated singular value decomposition algorithm.

4. The method as set forth in claim 1, further comprising the step of generating an index for each term in said set of query feedback terms that indicates terms from said documents that co-occur with a specified number of words within said documents.

5. The method as set forth in claim 1, further comprising the step of processing said documents to select nouns as said query feedback terms.

6. The method as set forth in claim 5, further comprising the step of processing said documents to select phrases of at least two words, wherein said words comprise nouns or an adjective followed by a noun.

7. The method as set forth in claim 1, wherein the step of selecting, as query feedback, query feedback terms with co-occurrence signatures that compare with co-occurrence signatures of said query term comprises the step of selecting a fixed number of query feedback terms with co-occurrence signatures that compare closest with co-occurrence signatures of said query terms.

8. The method as set forth in claim 1, wherein the step of selecting, as query feedback, query feedback terms with co-occurrence signatures that compare with co-occurrence signatures of said query term comprises the step of selecting query feedback terms with co-occurrence signatures that compare with co-occurrence signatures of said query terms in accordance with a predetermined cut-off.

9. A computer readable medium comprising a plurality of instructions, which when executed by a computer, cause the computer to perform the steps of:

storing a plurality of query feedback terms identified through a plurality of documents for use as query feedback in an information retrieval system;

generating a plurality of co-occurrence signatures for each query feedback term in a set of said query feedback terms, wherein a co-occurrence signature comprises a plurality of entries, such that each entry depicts a co-occurrence distance between two query feedback terms as they appear in said documents, wherein said signatures depict patterns of semantic distance among said different query feedback terms;

processing said signatures to reduce a number of said entries in said signature while preserving said co-occurrence distance characteristic among said signatures;

selecting, as query feedback, query feedback terms with co-occurrence signatures that compare with co-occurrence signatures of said query term in a predetermined manner; and displaying said query feedback terms as at least a partial response to said query.

10. The computer readable medium as set forth in claim 9, wherein:

the step of generating a plurality of signatures for each query feedback term comprises the step of generating an N×N sized matrix of said co-occurrence signatures, wherein N represents a number of query feedback terms in said set of query feedback terms; and the step of processing said signatures to reduce a number of said entries in said co-occurrence signatures comprises the step of reducing said size of said N×N matrix to a N×M matrix, wherein M comprises an integer value less than N.

11. The computer readable medium as set forth in claim 10, wherein the step of reducing said size of said N×N matrix to a N×M matrix comprises the step of executing an updated singular value decomposition algorithm.

12. The computer readable medium as set forth in claim 9, further comprising the step of generating an index for each term in said set of query feedback terms that indicates terms from said documents that co-occur with a specified number of words within said documents.

13. The computer readable medium as set forth in claim 9, further comprising the step of processing said documents to select nouns as said query feedback terms.

14. The computer readable medium as set forth in claim 13, further comprising the step of processing said documents to select phrases of at least two words, wherein said words comprise nouns or an adjective followed by a noun.

15. The computer readable medium as set forth in claim 9, wherein the step of selecting, as query feedback, query feedback terms with co-occurrence signatures that compare with co-occurrence signatures of said query term comprises the step of selecting a fixed number of query feedback terms with co-occurrence signatures that compare closest with co-occurrence signatures of said query terms.

16. The computer readable medium as set forth in claim 9, wherein the step of selecting, as query feedback, query feedback terms with co-occurrence signatures that compare with co-occurrence signatures of said query term comprises the step of selecting query feedback terms with co-occurrence signatures that compare with co-occurrence signatures of said query terms in accordance with a predetermined cut-off.

17. A computer system comprising:

memory for storing a plurality of query feedback terms identified through a plurality of documents for use as query feedback in an information retrieval system;

processor unit, coupled to said memory, for generating a plurality of co-occurrence signatures for each query feedback term in a set of said query feedback terms, wherein a co-occurrence signature comprises a plurality of entries, such that each entry depicts a co-occurrence distance between two query feedback terms as they appear in said documents, wherein said signatures depict patterns of semantic distance among said different query feedback terms, said processor unit for processing said signatures to reduce a number of said entries in said signature while preserving said co-occurrence distance characteristic among said signatures, and for selecting, as query feedback, query feedback terms with co-occurrence signatures that compare with co-occurrence signatures of said query term in a predetermined manner; and an output display for displaying said query feedback terms as at least a partial response to said query.

* * * * *